United States Patent [19]

Frankenbery

[11] Patent Number: 5,088,233
[45] Date of Patent: Feb. 18, 1992

[54] GYPSY MOTH LARVAE BARRIER APPARATUS

[76] Inventor: Lee R. Frankenbery, P.O. Box 184, Chalk Hill, Pa. 15421

[21] Appl. No.: 675,876

[22] Filed: Mar. 27, 1991

[51] Int. Cl.⁵ .............................................. A01G 17/12
[52] U.S. Cl. ...................................................... 47/24
[58] Field of Search ...................... 47/24, 23, 25, 57.5, 47/58

[56] References Cited

U.S. PATENT DOCUMENTS

| | | | |
|---|---|---|---|
| 2,011,405 | 8/1935 | Giliasso | 47/24 |
| 2,022,937 | 2/1935 | Kirkpatrick | 47/24 |
| 2,389,870 | 11/1945 | Reevely | 47/24 |
| 2,947,111 | 8/1960 | Zobrist | 47/24 |
| 4,766,695 | 8/1988 | Harlow | 47/24 |

FOREIGN PATENT DOCUMENTS 120825  7/1939  Hungary .................................. 47/24

*Primary Examiner*—David A. Scherbel
*Assistant Examiner*—Michele A. Van Patten
*Attorney, Agent, or Firm*—Leon Gilden

[57] ABSTRACT

A porous, fibrous web is mounted coextensively and orthogonally relative to an axis of an associated tree trunk, wherein a central band is positioned medially and exteriorly of the web to mount and secure the band relative to the associated tree trun. The invention may further include an insecticide dispensing further band projected through a top surface of the web to dispense a pesticide solution into the web.

5 Claims, 5 Drawing Sheets

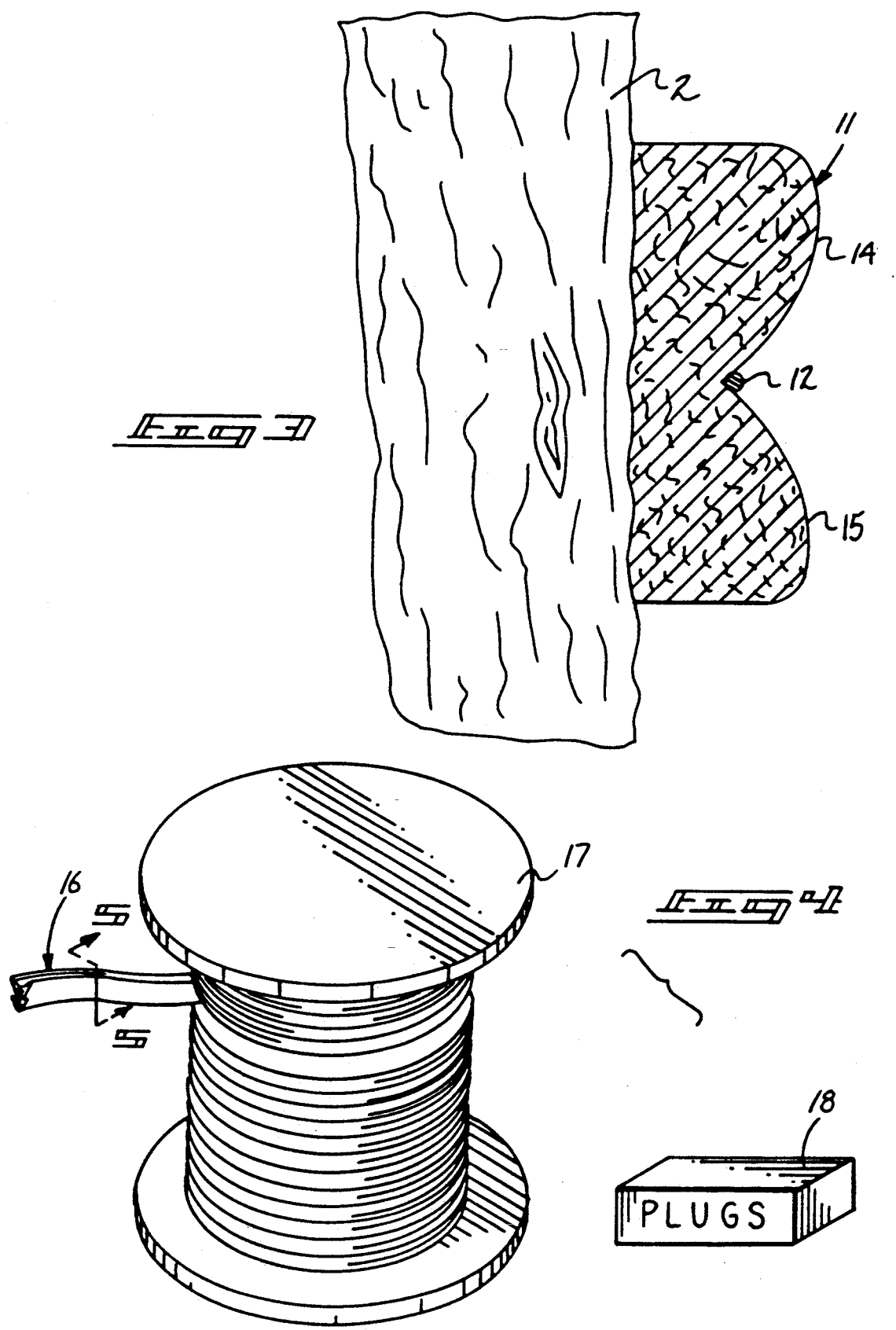

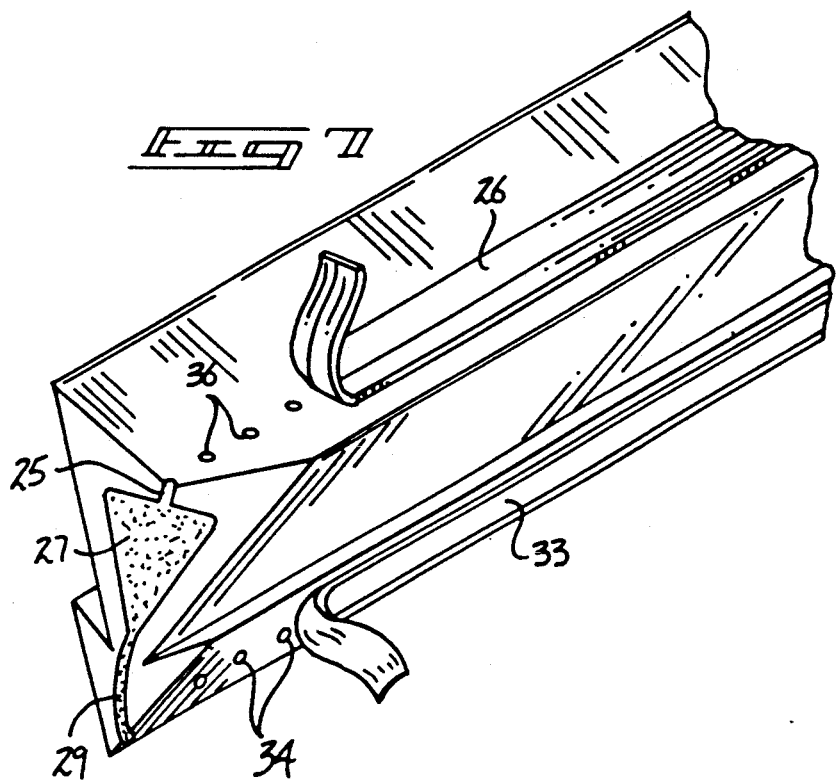
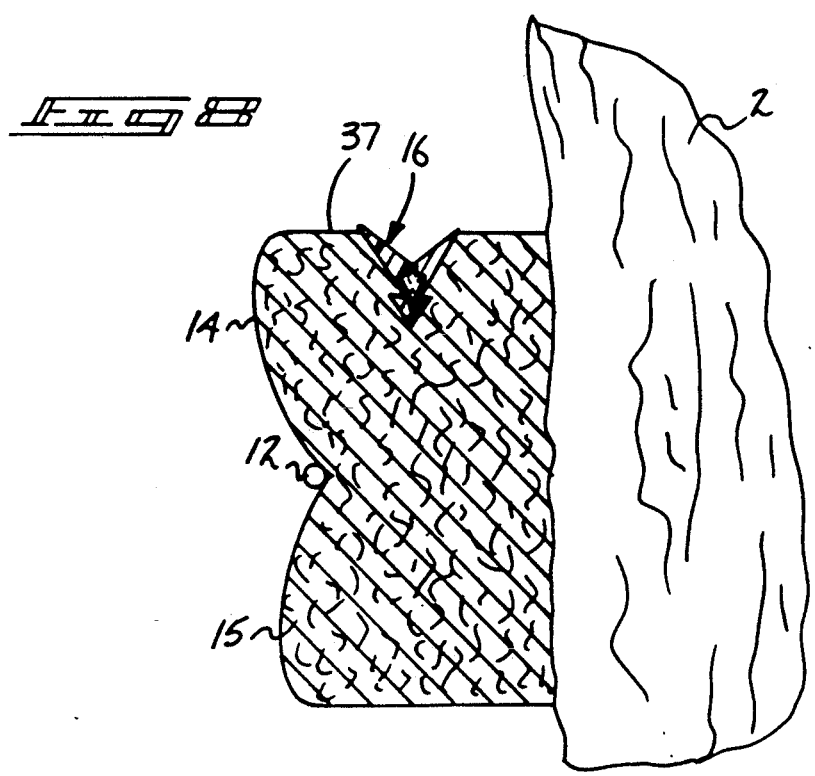

GYPSY MOTH LARVAE BARRIER APPARATUS

BACKGROUND OF THE INVENTION

1. Field of the Invention

The field of invention relates to insect barrier structure, and more particularly pertains to a new and improved gypsy moth larvae barrier apparatus wherein the same is arranged for the prevention of access of gypsy moth larvae and other crawling insects to direct travel upwardly about a tree trunk for access to an associated tree.

2. Description of the Prior Art

Gypsy moth infestations have effected tree growth to limit, and in some instances destroy, the foliage of deciduous and coniferous trees. Serious infestations will destroy trees wherein barrier spraying has assisted resistance due to the application of such spray over a large area, as well as the trees. The cycle of a gypsy moth and larvae are such that the larvae crawl to the foliage adjacent portions of a tree. The instant invention attempts to overcome deficiencies of the prior art by providing a readily efficient barrier mounted to an associated tree trunk to prevent such traverse of the tree trunk. Examples of the prior art include U.S. Pat. No. 4,766,695 to Harlow utilizing a tree-protecting band formed of a flexible polymeric film utilizing an adhesive or elastomeric material layer on a surface and contact with a tree and coating the exterior surface of the tree with a gypsy moth toxin.

U.S. Pat. No. 4,223,007 to Spence, et al. sets forth a microbial insecticide for use in protection of trees.

U.S. Pat. No. 3,885,341 to Kuchenbecker, et al. sets forth a gypsy moth trap utilizing one-way ports mounted within a container for receiving an insect therewithin.

As such, it may be appreciated that there continues to be a need for a new and improved gypsy moth larvae barrier apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of gypsy moth barrier apparatus now present in the prior art, the present invention provides a gypsy moth larvae barrier apparatus wherein the same is arranged for mounting in a continuous manner about an associated tree trunk to prevent traverse of gypsy moth larvae over the tree trunk for access to foliage of an associated tree. As such, the general purpose of the present invention, which will be described subsequently in greater detail, is to provide a new and improved gypsy moth larvae barrier apparatus which has all the advantages of the prior art gypsy moth barrier organizations and none of the disadvantages.

To attain this, the present invention provides a porous, fibrous web mounted coextensively and orthogonally relative to an axis of an associated tree trunk, wherein a central band is positioned medially and exteriorly of the web to mount and secure the band relative to the associated tree trunk. The invention may further include an insecticide dispensing further band projected through a top surface of the web to dispense a pesticide solution into the web.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gypsy moth larvae barrier apparatus which has all the advantages of the prior art gypsy moth barrier organizations and none of the disadvantages.

It is another object of the present invention to provide a new and improved gypsy moth larvae barrier apparatus which may be easily and efficiently manufactured and marketed.

It is a further object of the present invention to provide a new and improved gypsy moth larvae barrier apparatus which is of a durable and reliable construction.

An even further object of the present invention is to provide a new and improved gypsy moth larvae barrier apparatus which is susceptible of a low cost of manufacture with regard to both materials and labor, and which accordingly is then susceptible of low prices of sale to the consuming public, thereby making such gypsy moth larvae barrier apparatus economically available to the buying public.

Still yet another object of the present invention is to provide a new and improved gypsy moth larvae barrier apparatus which provides in the apparatuses and methods of the prior art some of the advantages thereof, while simultaneously overcoming some of the disadvantages normally associated therewith.

Still another object of the present invention is to provide a new and improved gypsy moth larvae barrier apparatus wherein the same is arranged for circumferential mounting about a tree trunk preventing access of gypsy moth larvae to uppermost portions of an associated tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic cross-sectional illustration of the instant invention.

FIG. 4 is an isometric illustration of a dispensing band for use in association with the instant invention.

FIG. 7 is an isometric illustration of the dispensing band of the instant invention with the tape members removed for access to channel openings of the band.

FIG. 8 is an orthographic cross-sectional view of the dispensing band.

DESCRIPTION OF THE PREFERRED EMBODIMENT

Figure 1:
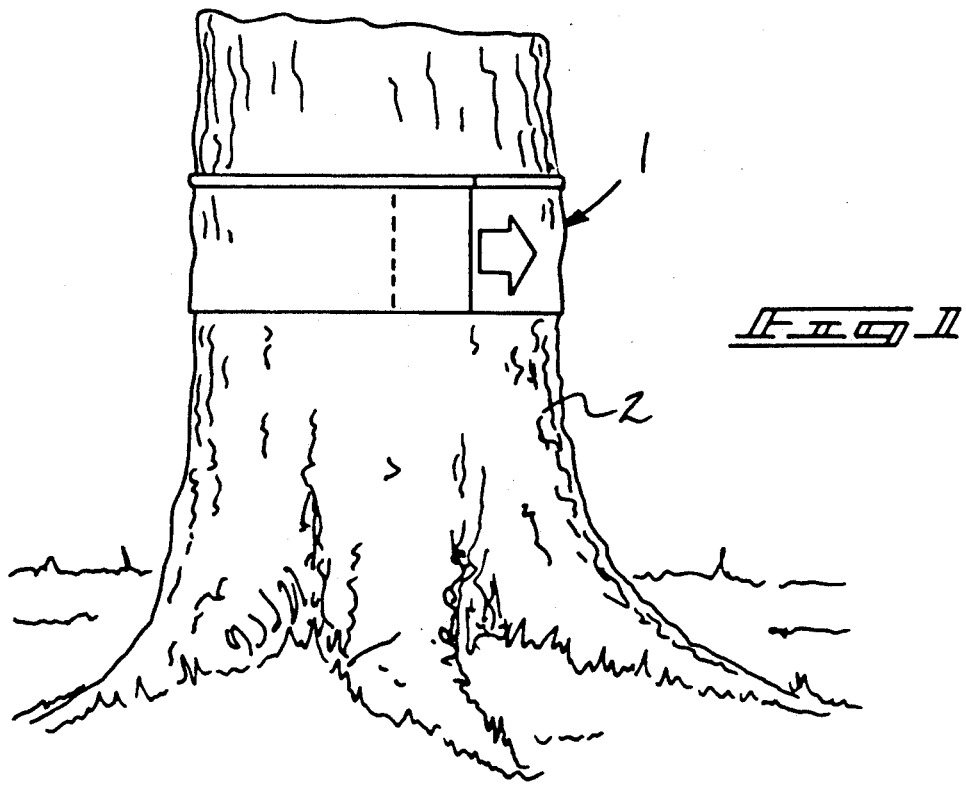
FIG. 1 is an orthographic side view, taken in elevation, of a prior art barrier apparatus.
Figure 2:
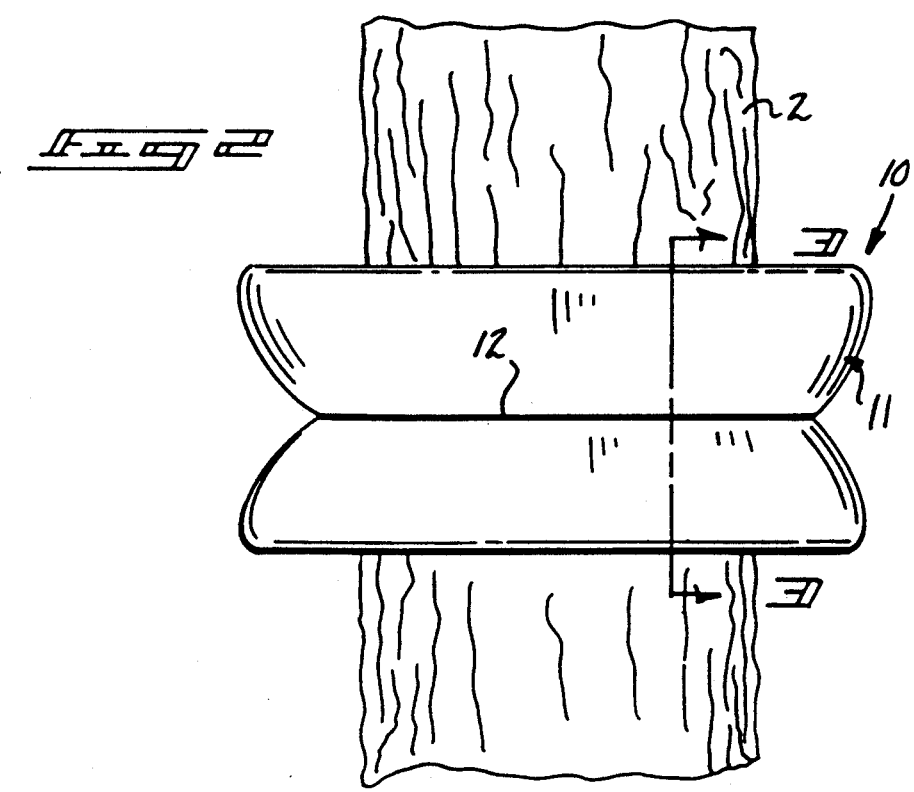
FIG. 2 is an orthographic side view, taken in elevation, of the instant invention.
Figure 5:
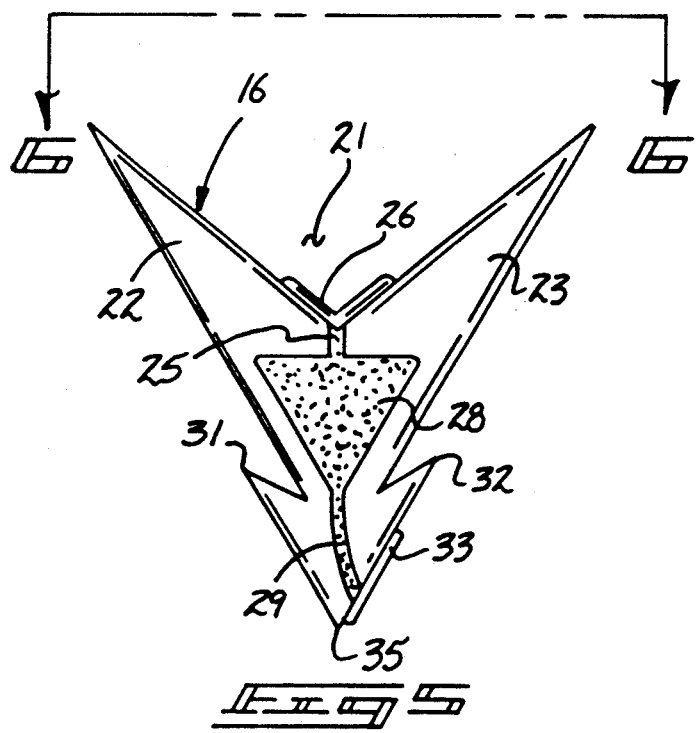
FIG. 5 is an orthographic cross-sectional illustration of the dispensing band as set forth in FIG. 4.
Figure 6:
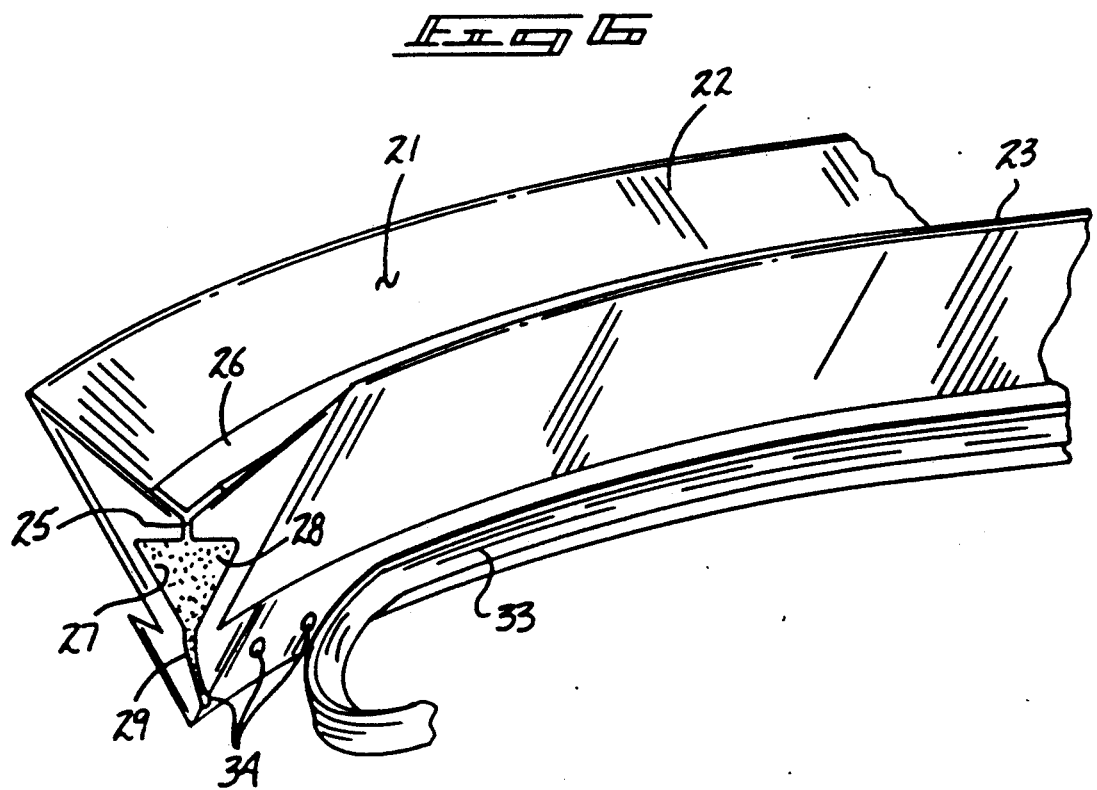
FIG. 6 is an isometric illustration of the dispensing band of the instant invention.
Figure 9:
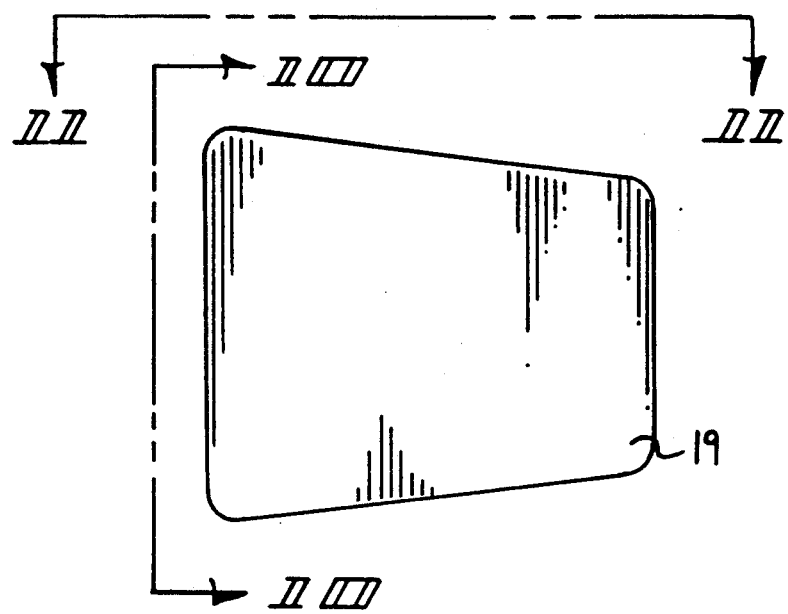
FIG. 9 is an orthographic top view of a plug member utilized by the dispensing band of the instant invention.
Figure 10:
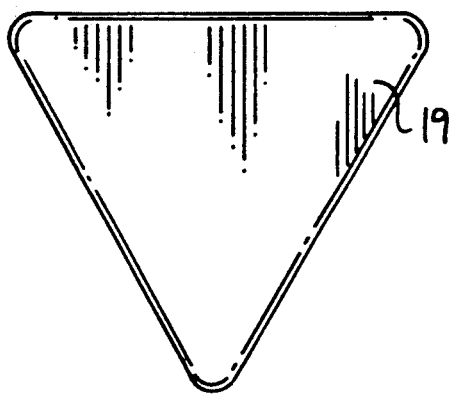
FIG. 10 is an orthographic end view of the dispensing band of the instant invention, taken along the lines 10—10 of FIG. 9 in the direction indicated by the arrows.

With reference now to the drawings, and in particular to FIGS. 1 to 11 thereof, a new and improved gypsy moth larvae barrier apparatus embodying the principles and concepts of the present invention and generally designated by the reference numeral 10 will be described.

FIG. 1 illustrates a prior art gypsy moth larvae barrier structure, as set forth in U.S. Pat. No. 4,766,695, wherein the polymeric band of the invention 1 is mounted about a tree trunk 2 utilizing an adhesive or elastomeric interior surface and an exterior coating of an insecticide.

More specifically, the gypsy moth larvae barrier apparatus 10 of the instant invention essentially comprises a porous, fabric web 11 mounted continuously about a tree trunk to orthogonally align relative to an axis of the tree trunk. A mounting band 12 of an elastomeric or flexible construction is mounted about the web medially of the web to define a central web valley circumferentially directed about an exterior surface of the web defining an upper projecting barrier ridge 14 and a lower projecting ridge 15 to effect impediment to larvae attempting traverse of the web.

Further, the organization may optionally utilize a dispensing band 16 that is utilized and projected through a web top surface 37 (see FIG. 8) to provide supplemental projection of a pesticide or insecticide within the web 11. The band 16 may be provided by a spool 17 of such material and the band 16 severed from the spool of a length as desired dependent upon the circumferential dimension of an associated tree trunk 2. A plug member 19 contained within a plug member container 18 is utilized, wherein the plug member (see FIGS. 9-11) is directed within a complementarily configured central reservoir cavity 27 that is formed within a central body portion 24, to be described in more detail below.

Figure 11:
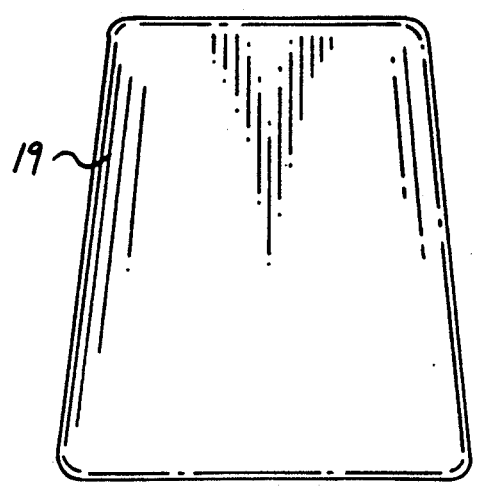
FIG. 11 is an orthographic side view, taken in elevation, of the plug member utilized by the instant invention.

Reference to FIGS. 5-8 illustrate the use of the dispensing band 16 that is formed to define a band trough 21 formed to a top surface of the dispensing band, wherein the trough 21 is defined between a rear wing 22 and a forward wing 23 that project upwardly to define the central band trough 21. The dispensing band includes the central body portion 24 that coextensively is formed with a first channel 25 that bisects an included angle defined by an intersection or junction defined by the rear and forward wings 22 and 23 and projects in communication with the band trough 21 into the first channel 25 that is coextensively formed throughout the body portion 24. Reference to FIG. 11 illustrates that a plurality of first channel entrance openings 36 directed into the top surface of the dispensing band 16 or the junction of the rear and forward wings is in communication with the first channel 25. The reservoir cavity 27 is filled with a pesticide powder 28, wherein a lower terminal end of the generally triangular cavity 27 includes a lower pointed end into fluid communication with a dispensing channel 29 that is aligned with the first channel 25, with the dispensing channel 29 projecting through a forward face of the dispensing band 16 adjacent a lower terminal pointed end 35. The lower body portion 30 of the dispensing band 16 is formed of a generally arrow shaped configuration, including rear and forward spur projections 31 and 32 that are directed rearwardly to enhance engagement of the dispensing band 16 within the web top surface 37. A first removable tape 26 is removably mounted overlying the plurality of the first channel entrance openings 36, with a second removable tape 33 removably mounted overlying the dispensing channel openings 34. During irrigation or accumulation of rain within the band trough 21, water is directed into the first channel entrance openings 36 and thereafter into the central reservoir cavity 27 to effect directing of an aqueous solution of pesticide or insecticide directed through the dispensing channel openings 34 into the body of the porous web 11. In this manner, the web is eventually and continuously metered with the insecticide to further inhibit traverse of various insects thereacross.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A gypsy moth larvae barrier apparatus for mounting about a tree trunk, wherein the tree trunk is defined by a trunk access, and the apparatus comprising, a porous, fabric web circumferentially and continuously mounted about the tree trunk to define a continuous web orthogonally oriented relative to the axis, and the web including an exterior surface and an interior surface, the interior surface in contiguous communication with the tree trunk, the exterior surface including a mounting band continuously positioned in contiguous communication with the exterior surface of the web for securement of the web to the tree trunk, and the mounting band defining a central web valley positioned medially and circumferentially to the exterior surface of the web defining an upper projecting barrier ridge and a lower projecting barrier ridge, and further including a dispensing band, and the web including a web top surface adjacent the upper projecting barrier ridge, with the dispensing band mounted within the web top surface, and the dispensing band including a central reservoir cavity, and the dispensing band including a top surface, the top surface including first channel means directed from the top surface into communication with the central reservoir cavity for directing fluid into the central reservoir cavity, and second channel means in communication with the central reservoir cavity and projecting from the central reservoir cavity to a lower side wall surface for directing a fluid mixture from the central reservoir cavity exteriorly of the dispensing band and into the porous fabric web.

2. An apparatus as set forth in claim 1 wherein the dispensing band top surface includes a band trough, and the top surface includes a rear wing and a forward wing, the rear wing and the forward wing positioned to each side of the band trough defining a junction medially of a top surface, and the junction including the first channel means directed from the junction into the central reservoir cavity.

3. An apparatus as set forth in claim 2 wherein the first channel means includes a plurality of first channel entrance openings directed through the junction, and wherein the first channel means further includes a first channel coextensively directed through the dispensing band between the junction and the central reservoir cavity, with the first channel entrance openings directed through the junction into the first channel, and a removable first tape coextensively mounted overlying the junction permitting access of fluid into the first channel entrance openings upon removal of the first tape.

4. An apparatus as set forth in claim 3 wherein the dispensing band includes a lower body portion positioned underlying and integrally mounted to the body portion, with the lower body portion defined by a generally arrow shaped cross-sectional configuration, and including a rear and forward spur projection formed through the lower body portion to enhance securement of the dispensing band within the fabric web.

5. An apparatus as set forth in claim 4 wherein the second channel means includes a plurality of dispensing channel openings directed through the lower body portion into communication with a dispensing channel and the dispensing channel in fluid communication between the first channel entrance openings and a lower terminal end of the central reservoir cavity, with a second removable tape removably mounted overlying the dispensing channel openings to permit flow therethrough, and the central reservoir cavity including an insecticide powder filling the central reservoir cavity to direct an aqueous mixture of fluid and insecticide powder to flow through the dispensing channel and the dispensing channel openings into the porous fabric web.

* * * * *